US012450408B2

(12) United States Patent
Stanton et al.

(10) Patent No.: US 12,450,408 B2
(45) Date of Patent: Oct. 21, 2025

(54) MACHINE LEARNING FOR SELECTING INITIAL SOURCE SHAPES FOR SOURCE MASK OPTIMIZATION

(71) Applicant: Synopsys, Inc., Mountain View, CA (US)

(72) Inventors: William A. Stanton, Meridian, ID (US); Sylvain Berthiaume, Gatineau (CA); Hans-Jürgen Stock, Dachau (DE); Jay A. Hiserote, Hillsboro, OH (US)

(73) Assignee: Synopsys, Inc., Sunnyvale, CA (US)

( * ) Notice: Subject to any disclaimer, the term of this patent is extended or adjusted under 35 U.S.C. 154(b) by 759 days.

(21) Appl. No.: 17/829,714

(22) Filed: Jun. 1, 2022

(65) Prior Publication Data

US 2022/0382144 A1 Dec. 1, 2022

Related U.S. Application Data

(63) Continuation of application No. PCT/US2022/030384, filed on May 20, 2022.

(60) Provisional application No. 63/191,493, filed on May 21, 2021.

(51) Int. Cl.
*G06F 30/27* (2020.01)
*G03F 1/70* (2012.01)
*G03F 7/00* (2006.01)
*G06F 30/30* (2020.01)
(Continued)

(52) U.S. Cl.
CPC ............... *G06F 30/27* (2020.01); *G03F 1/70* (2013.01); *G03F 7/705* (2013.01); *G03F 7/706841* (2023.05); *G06F 30/398* (2020.01); *G06N 3/08* (2013.01)

(58) Field of Classification Search
None
See application file for complete search history.

(56) References Cited

U.S. PATENT DOCUMENTS 8,438,508 B2 * 5/2013 Liu .................. G03F 7/70425
716/54
8,739,082 B2 * 5/2014 Liu ........................ G03F 1/36
716/54

(Continued)

FOREIGN PATENT DOCUMENTS

WO WO 2020/156777 A1 8/2020
WO WO 2020/169303 A1 8/2020
WO WO 2021/037484 A1 3/2021

OTHER PUBLICATIONS

K. Lai et al., "Design Specific Joint Optimization of Masks and Sources on a Very Large Scale," Optical Microlithography XXIV, Proc. of SPIE vol. 7973, 2011, 13 pages. (Year: 2011).*
T. Gai et al., "Sample patterns extraction from layout automatically based on hierarchical cluster algorithm for lithography process optimization," Design-Process-Technology Co-optimization XIII, Proc. of SPIE vol. 10962, 2019, 9 pages. (Year: 2019).*

(Continued)

*Primary Examiner* — Leigh M Garbowski
(74) *Attorney, Agent, or Firm* — Fenwick & West LLP

(57) ABSTRACT

Initial source shapes for source mask optimization are determined based on a layout of the lithographic mask. In one approach, a layout of a lithographic mask is received. Different sections of the lithographic mask, referred to as clips, are selected. These clips are applied to a machine learning model which infers source shapes from the clips. The inferred source shapes are used as the initial source shapes for source mask optimization.

20 Claims, 8 Drawing Sheets

(51) Int. Cl.
*G06F 30/398* (2020.01)
*G06N 3/08* (2023.01)

(56) References Cited

U.S. PATENT DOCUMENTS

| | | | | |
|---|---|---|---|---|
| 8,954,898 | B2* | 2/2015 | Inoue | G03F 7/70441 |
| | | | | 716/52 |
| 9,588,438 | B2* | 3/2017 | Hsu | G03F 7/705 |
| 9,934,346 | B2* | 4/2018 | Hansen | G03F 7/70433 |
| 10,409,165 | B2* | 9/2019 | Liu | G03F 7/70441 |
| 11,755,814 | B2* | 9/2023 | Chen | G06N 3/045 |
| | | | | 716/102 |
| 2011/0099526 | A1 | 4/2011 | Liu | |
| 2012/0113404 | A1 | 5/2012 | Hsu et al. | |
| 2018/0314163 | A1* | 11/2018 | Liu | G03F 7/70441 |
| 2020/0051781 | A1 | 2/2020 | Fujimura et al. | |
| 2020/0356011 | A1* | 11/2020 | Su | G06N 20/00 |
| 2022/0179325 | A1* | 6/2022 | Hsu | G03F 7/70683 |
| 2024/0037897 | A1* | 2/2024 | Li | G03F 7/70508 |

OTHER PUBLICATIONS

Y. Lin et al., "Data Efficient Lithography Modeling With Transfer Learning and Active Data Selection," IEEE Trans. on Computer-Aided Design of Integrated Circuits and Systems, vol. 38, No. 10, Oct. 2019, pp. 1900-1913. (Year: 2019).*

T. Cecil et al., "Establishing Past, Practical, Full-chip ILT Flows Using Machine Learning," Optical Microlithography XXXIII, Proc. of SPIE vol. 11327, 2020, 18 pages. (Year: 2020).*

Luo, R. "Optical Proximity Correction Using a Multilayer Perceptron Neural Network." Journal of Optics, vol. 15, No. 7, Jun. 4, 2013, pp. 1-6.

PCT International Search Report and Written Opinion, PCT Application No. PCT/US2022/030384, Sep. 9, 2022, 18 pages.

Torunoglu, I. et al. "A GPU-Based Full-Chip Source-Mark Optimization Solution." Proceedings of SPIE, Optical Microlithography XXIII, vol. 7640, Mar. 3, 2010, pp. 1-10.

Tsai, M-C. et al. "Full-Chip Source and Mask Optimization." Proceedings of SPIE, Optical Microlithography XXIV, vol. 7973, Mar. 22, 2011, pp. 1-11.

* cited by examiner

MACHINE LEARNING FOR SELECTING INITIAL SOURCE SHAPES FOR SOURCE MASK OPTIMIZATION

RELATED APPLICATION

This application is a continuation of International Application No.: PCT/US2022/030384, filed on May 20, 2022, which claims priority to U.S. Provisional Patent Application Ser. No. 63/191,493, "Machine Learning for Selecting Initial Source Shapes for Source Mask Optimization," filed May 21, 2021. The subject matter of all of the foregoing is incorporated herein by reference in their entirety.

TECHNICAL FIELD

The present disclosure generally relates to a mask synthesis simulation system. In particular, the present disclosure relates to using machine learning models to select initial source shapes.

BACKGROUND

One step in the manufacture of semiconductor wafers involves lithography. In a typical lithography process, an illumination source produces light that is collected and directed by collection/illumination optics to illuminate a lithographic mask. Projection optics relay the pattern produced by the illuminated mask onto a wafer, exposing resist on the wafer according to the illumination pattern. The patterned resist is then used in a process to fabricate structures on the wafer.

Source mask optimization refers to the process of designing the source shape in conjunction with the lithographic mask. Source shape is a term that includes both the illumination source and the collection/illumination optics. In one approach to source mask optimization, various different starting points are used for the source shapes in the source mask optimization. These initial source shapes are then improved and combined to yield the final source shape, i.e., the final design of the illumination source and/or collection/illumination optics.

SUMMARY

In some aspects, initial source shapes are determined based on a layout of the lithographic mask, instead of being arbitrarily chosen. In one approach, a layout of a lithographic mask is received. Different sections of the lithographic mask, referred to as clips, are selected. These clips are applied to a machine learning model which infers source shapes from the clips. The inferred source shapes are used as the initial source shapes for the source mask optimization process.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to machine learning for selecting initial source shapes for source mask optimization. Source mask optimization (SMO) uses starting conditions which include initial source shape(s) for the SMO process. The source shapes may be represented in pixelated, parameterized or other forms. Typically, these initial source shape(s) are arbitrary. They are not related to features on the lithographic mask, even though the source will be used to illuminate the lithographic mask and the source and lithographic mask will be the subject of the SMO design process. Because the initial source shapes do not take into account information about the mask layout, this approach can lead to longer optimization runtimes and non-optimal solutions.

In one aspect, a machine learning model is used to determine initial source shapes based on the actual mask layout. The machine learning model may be trained using results from prior mask designs. When a new design task is encountered, clips from the layout of the lithographic mask are selected. For example, these clips may be the sections of the mask layout that are most challenging to manufacture or most sensitive to variations in the lithography process. The selected clips are used as input to the machine learning model, which infers corresponding source shapes. The inferred source shapes are used as initial source shapes for the SMO process.

The selection of better starting points for the SMO process can result in a shorter runtime and faster convergence for the overall design process. The resulting designs can also produce better results. For example, the design may have a larger lithographic process window, meaning that the design is less sensitive to process variations.

Figure 1:
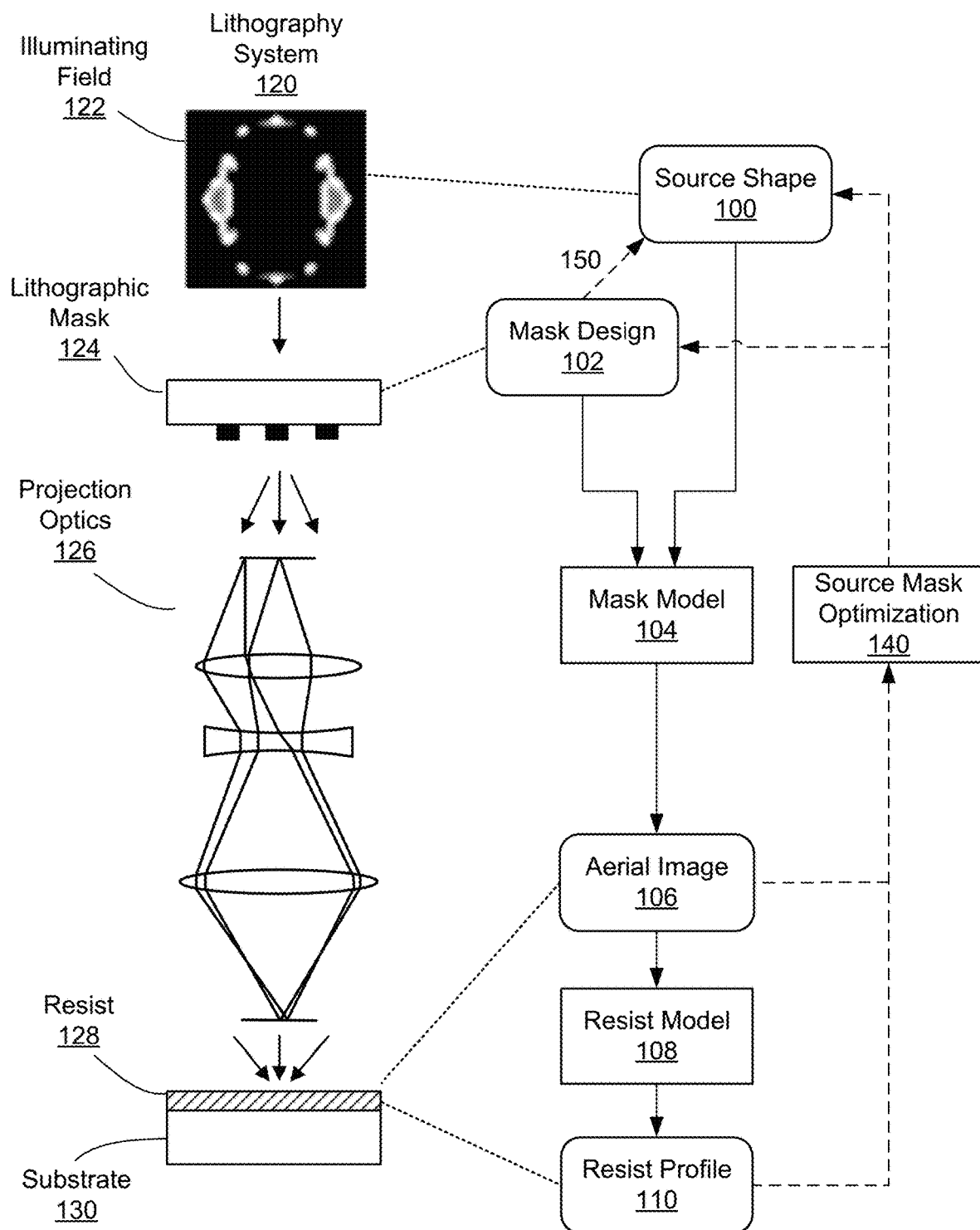
FIG. 1 is a flowchart of a source mask optimization flow in accordance with embodiments of the present disclosure.

FIG. 1 is a flowchart of a source mask optimization process in accordance with embodiments of the present disclosure. The left side of FIG. 1 shows a lithography system 120 and the right side of FIG. 1 shows a computational lithography flow for simulating that system. In a lithography system 120, a light source (not shown) produces a light distribution (the illuminating field 122) that is incident on a lithographic mask 124 that has a certain mask topology. Light from the illuminating field 122 propagates through the lithographic mask 124 or is reflected by the mask, resulting in a light distribution referred to as the near field. The near field is imaged by projection optics 126 onto resist 128 on a substrate 130 (e.g., a semiconductor wafer). The light distribution illuminating the resist 128 is referred to as the aerial image. The aerial image exposes a resist process (e.g., including exposure, post-exposure bake (PEB), and development) that results in a three-dimensional shape (profile) in the resist 128. Terms such as light and optical are meant to include all relevant wavelengths, including ultraviolet, deep ultraviolet and extreme ultraviolet, and are not limited to just visible wavelengths.

The right side of FIG. 1 shows a computational lithography flow that simulates the lithography system 120. The source shape 100 includes the effects of the illuminating source and collection/illumination optics that produce the illuminating field 122. In the following examples, the source shape is a two-dimensional representation of the intensity of the source. It may be represented as a bitmap image. The illuminating field 122 is the physical realization of the source shape. This illuminating field 122 is incident on the lithographic mask 124, which in the simulation is represented by the mask design 102. A mask model 104 predicts the resulting aerial image 106 produced by the illuminating field 122 incident on the lithographic mask 124. The aerial image 106 is the light distribution that exposes the resist on the wafer. Accordingly, the model 104 typically includes propagation from the mask 124 through the projection optics 126 to the resist 128. A resist model 108 then simulates the exposure and development of the resist 128, yielding the final resist shape or profile 110.

It should be understood that each block labeled as a model in FIG. 1 may be implemented as several models. For example, the mask model 104 may include one model that simulates the effect of the lithographic mask 124 on the illuminating field 122 and another model that simulates propagation through the projection optics 126. As another example, the resist model 108 may include different models for the different physical effects during exposure and development of the resist 128.

The forward flow from the source shape 100 and mask design 102 to the resist profile 110, as indicated by the solid arrows, allows a user to simulate the results of a given source shape and lithographic mask. However, the design process also includes backward flows, as indicated by the dashed arrows. One example is source mask optimization (SMO) 140. In SMO, results from later stages in the forward flow, such as the predicted aerial image 106 and/or the predicted resist shape 110, are used to adjust the source shape 100 and/or mask design 102.

In a SMO process, the starting point for the source shape 100 is arbitrarily chosen. However, in FIG. 1, the initial source shape 100 is selected based on the layout of the lithographic mask 102, as indicated by dashed arrow 150.

Figure 2:
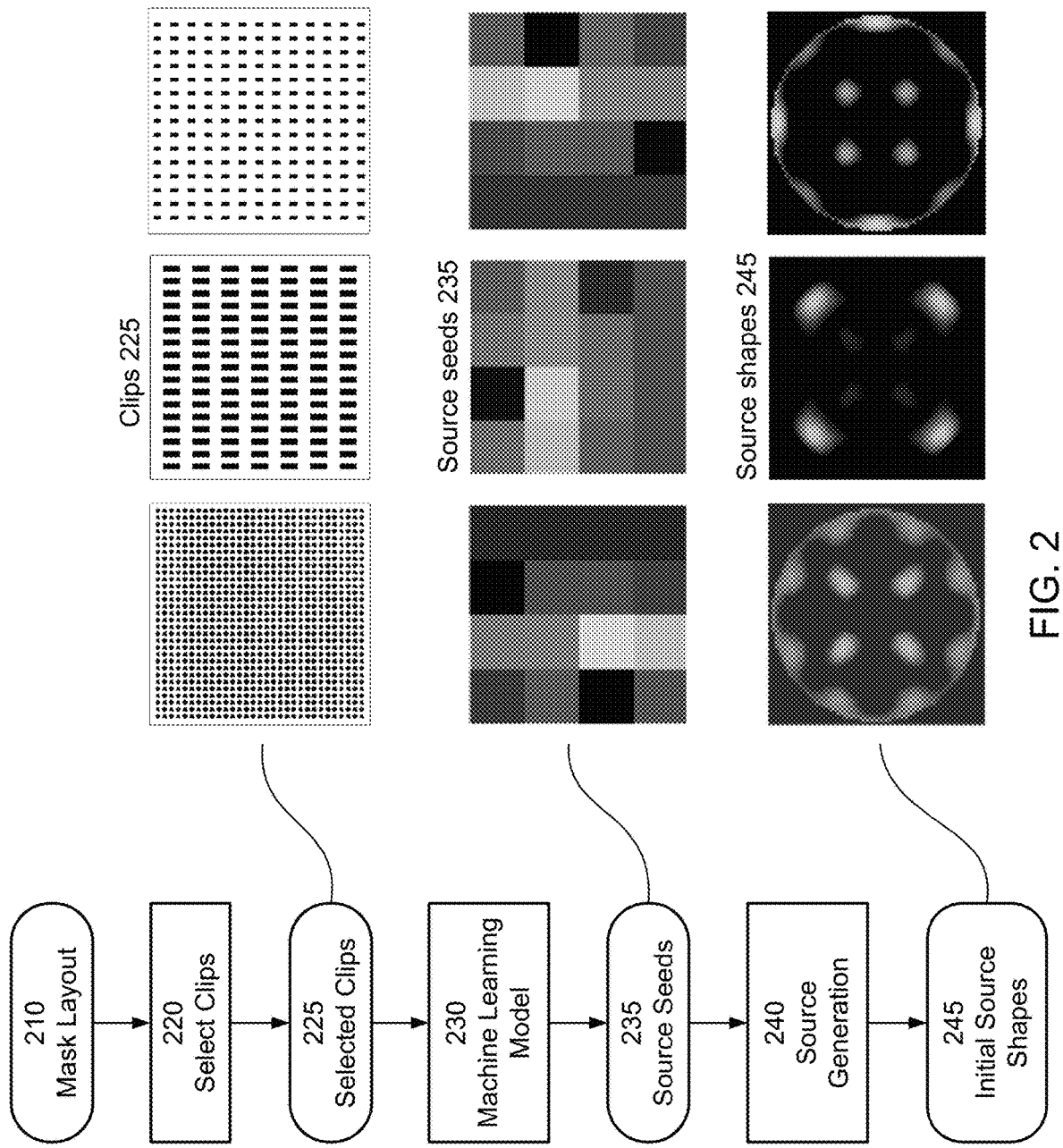
FIG. 2 is a flowchart illustrating use of a machine learning model to infer source seeds from an input mask layout in accordance with embodiments of the present disclosure.

FIG. 2 is a flowchart illustrating use of a machine learning model, such as a deep neural network, to infer initial source shapes from an input mask layout. The layout 210 of the lithographic mask is an input to this process. At 220, clips from the mask layout are selected. Clips are portions of the mask layout.

Typically, the clips that are the most difficult to manufacture or that are the most sensitive to process variations are selected. This may be determined by evaluating a sensitivity metric of the corresponding sections of the aerial images 106 or resist profiles 110 in FIG. 1. Features in the mask layout which result in difficulty or problems with the aerial images 106 or resist profiles 110 may be candidates for selection.

Alternatively, clips may be selected based on which clips are closest to design rule limits. The mask layout is subject to certain design rules, such as minimum spacing, minimum widths, etc. Some features on the mask will be close to the limit of what is allowed by these design rules. Clips may be selected because they include these features.

In some cases, features may be included on the mask for the purpose of monitoring or testing design rules. For example, features with the minimum allowed spacing or minimum allowed width may be included as test features. Clips including these test features may also be selected.

FIG. 2 shows three examples of clips 225 from different parts of a mask layout. These clips 225 are input to a trained machine learning model 230, which infers source seeds 235 for the different clips 220. Source seeds 235 are a representation of the source shape, but they are not the actual source shape. The source seeds 235 inferred for the three clips 225 is also shown in FIG. 2. These source seeds 235 are used to generate 240 the initial source shapes 245. For example, if the source seeds 235 are Fourier-Bessel coefficients of a representation of the source shape, then the source shapes may be generated 240 from the coefficients by using Eqn. 1 as explained in more detail below. The initial source shapes 245 may be used as input to an SMO process.

The process shown in FIG. 2 may be performed iteratively. For example, the mask layout 210 may change over the course of the design phase. Rather than repeating the entire method shown in FIG. 2, the method may iterate based on earlier results. For example, some of the source seeds for the new mask design may be taken from prior iterations rather than repeating the process of FIG. 2 in its entirety.

Figure 3:
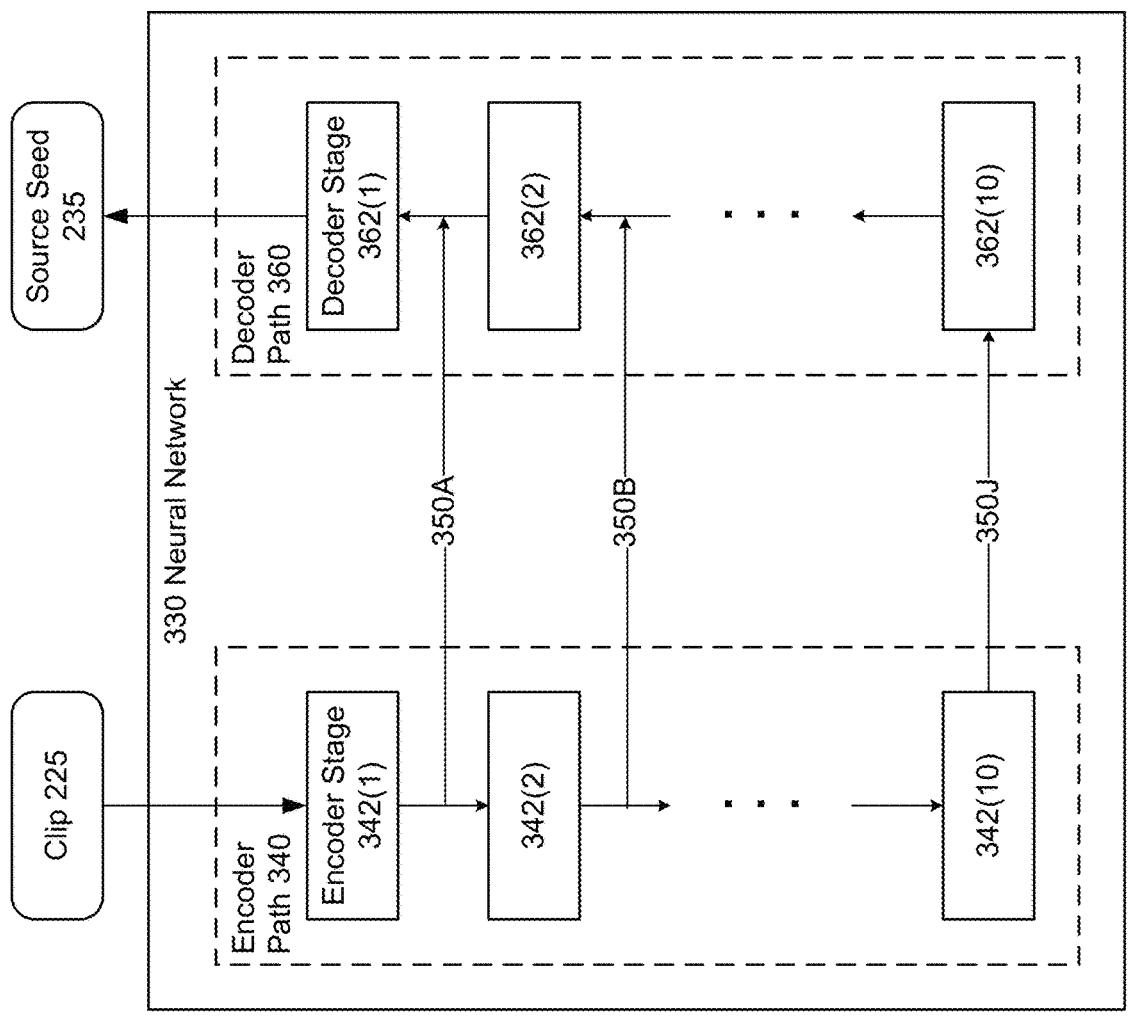
FIG. 3 shows an architecture of a neural network suitable for use in the process of FIG. 2.

FIG. 3 shows an architecture of a neural network 330 suitable for use in the process of FIG. 2. This neural network is a U-Net. The U-Net 330 includes an encoder path 340 and a decoder path 360. The encoder path 340 includes a series of stages 342 that include convolution and downsampling. If the input to a stage 342 has dimension M×M×J where the input image size is M height by M width with J channels, then the output of the stage typically has dimension N×N×K where N<M and K≥J. The decoder path 360 includes stages 362 that are the counterparts to the stages 342 in the encoder path 340. The decoder path 360 reverses the dimension changes of the encoder path 340. Table 1 below shows the dimensions of the images for each stage 342 and 362.

TABLE 1

Image sizes for different stages of U-net

| Encoder Stage | Output size | Output Size | Decoder Stage |
|---|---|---|---|
| Clip | 1024 × 1024 × 1 | 1024 × 1024 × 1 | Source Seed |
| 1 | 512 × 512 × 16 | 1024 × 1024 × 2 | 1 |
| 2 | 256 × 256 × 32 | 512 × 512 × 16 | 2 |
| 3 | 128 × 128 × 64 | 256 × 256 × 32 | 3 |
| 4 | 64 × 64 × 128 | 128 × 128 × 64 | 4 |
| 5 | 32 × 32 × 256 | 64 × 64 × 128 | 5 |
| 6 | 16 × 16 × 512 | 32 × 32 × 256 | 6 |
| 7 | 8 × 8 × 512 | 16 × 16 × 512 | 7 |
| 8 | 4 × 4 × 512 | 8 × 8 × 512 | 8 |
| 9 | 2 × 2 × 512 | 4 × 4 × 512 | 9 |
| 10 | 1 × 1 × 512 | 2 × 2 × 512 | 10 |

"Skip" links 350 connect stages 342 to corresponding stages 362. These links 350 allow encoding to be "skipped" by copying images into the decoder path 360 before the next stage of encoding. The addition of skip connections 350 forms a U-Net. This is an exemplary neural network model but is not the only model form which can be used. Models other than neural networks and machine learning models may also be used to select initial source shapes based on the layout of the lithographic mask.

The U-Net is a supervised deep learning model. Training of supervised deep learning models uses training sets of known input-output pairs. The output of each pair may be referred to as the ground truth or the target. The training set may be developed based on previously designed lithographic masks and source shapes. Alternatively, the training set may be developed based on a set of intentionally designed clips, which are individually run through the SMO flow to obtain the corresponding source shapes. The pairs of clips and source shapes then form the input/output pairs of the training set.

Figure 4C:
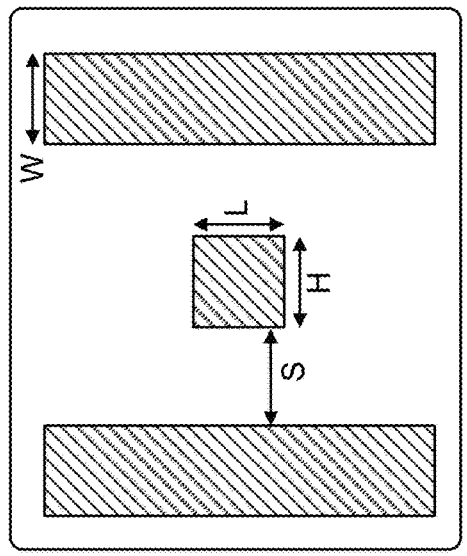
FIGS. 4A-4C show examples of parameterized clip patterns in accordance with embodiments of the present disclosure.
Figure 4B:
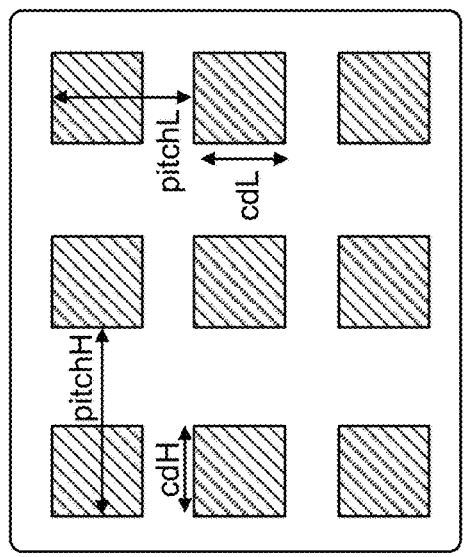
Figure 4A:
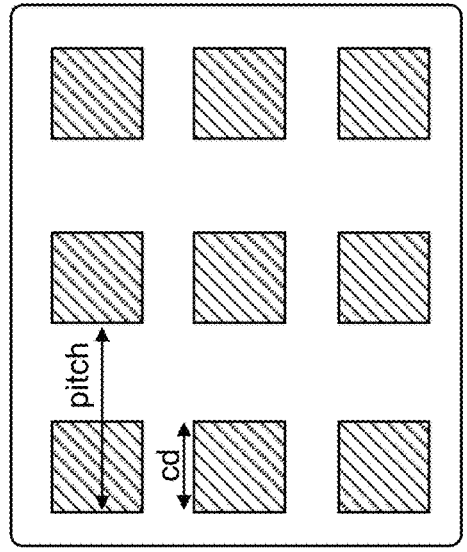

The following is an example training set. The training set includes over 1000 clips of basic patterns. These patterns include different geometries of one-dimensional and two-dimensional contacts, lines and spaces of varying dimensions. FIGS. 4A-4C show some of these patterns in parameterized form. In FIG. 4A, the pattern is a regular array of contacts. The parameters are the size of the contact "cd" and the pitch of the array "pitch." The array is symmetric in x and y, so only these two parameters are used. In FIG. 4B, the array of contacts is not symmetric in x and y. As a result, the parameters include two size parameters, cdH and cdL, and two pitch parameters, pitches and pitchL. In FIG. 4C, the pattern is a block contact. The contact is located between two stripes. The parameters are the size of the contact, height H and length L, the width of each stripe W, and the spacing S between the contact and stripe.

The clips in the training set are generated from these parameterized forms based on the design rules for the technology node. The clips are generated in a manner that avoids repeating identical patterns. In this example, there are 996 unique layouts which are divided into 966 for training and 30 for testing. Each pattern is run through an SMO flow and the resulting source shapes are paired with the clips to form input/output pairs. In this example, Normalized Image Log Slope (NILS) is used as the optimization objective for the cost calculation. Other objectives may also be used, for example other types of Image Log Slope (ILS) objectives.

Figure 5:
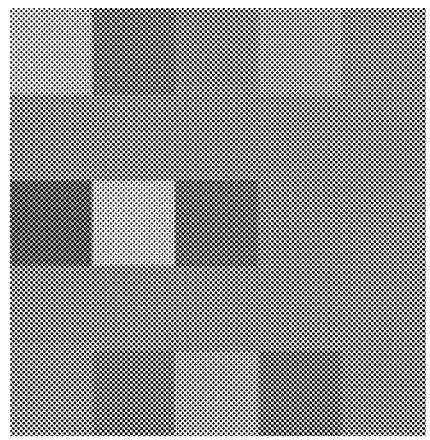
FIG. 5 shows an example mask clip and corresponding source seed in accordance with embodiments of the present disclosure.
Figure 5:
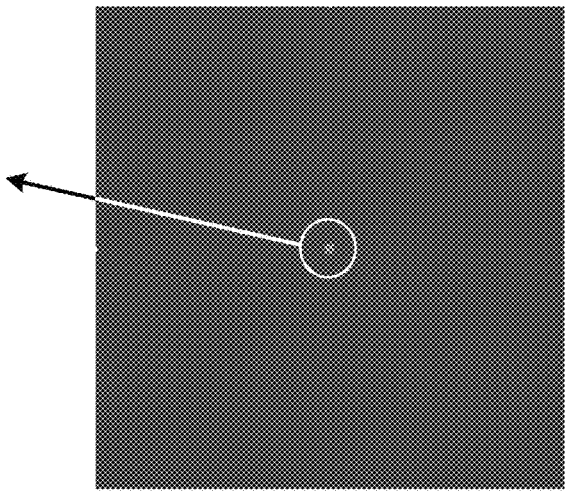
Figure 5:
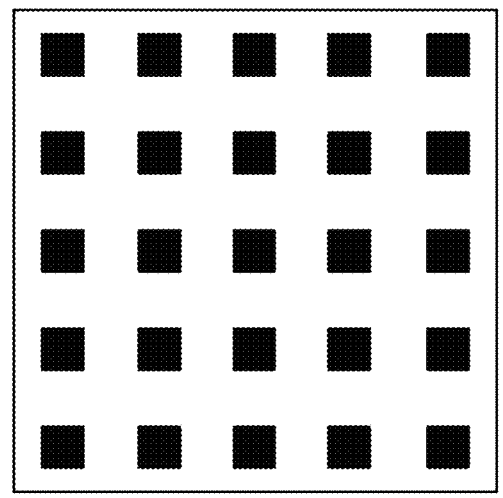

These data are then manipulated with patterns being rasterized and the source shapes are represented in terms of Fourier Bessel functions. FIG. 5 shows an example training sample. The mask clip is shown on the left. This is the input for the training sample. The ground truth output is shown on the bottom right. The ground truth output is an image of an encoding of the source shape. This specific reformulation of the source shape is in terms of Fourier Bessel functions. The formula which describes the source shape is given below.

$$I = \begin{cases} \sum_{m,n} a_{mn} J_m\left(\frac{x_{mn} r}{r_{max}}\right) \cos(m\theta) & r < r_{max} \\ 0 & r > r_{max} \end{cases} \quad (1)$$

This equation describes how each pixel intensity is computed in terms of polar coordinates (r,θ) in source space. Here, $a_{mn}$ are the Fourier Bessel coefficients, $J_m$ is the Fourier Besssel function of the mth order and $x_{mn}$ is the nth zero of $J_m$ (1≤n≤4). These parameters are encoded as the image shown on the right side of FIG. 5. Most of the coefficients are set to zero. FIG. 5 also includes a magnified view of the non-zero lower order coefficients.

The coefficients are translated from an allowed floating-point value of −1.0 to 1.0 (as shown in FIG. 5), to an integer value of 0 to 254 to represent an image. Using this encoding reduces the number of free parameters to be trained and results in a more accurate neural network model.

Other representations of the source shape may also be used. A Cartesian representation of the source could be used. The pixel position (x,y or, r,θ) and intensity values could be used instead of the Fourier Bessel coefficients. Parametric source shapes may also be used. For example, an annular source shape could be represented by an inner diameter and outer diameter as parameters.

Figure 6:
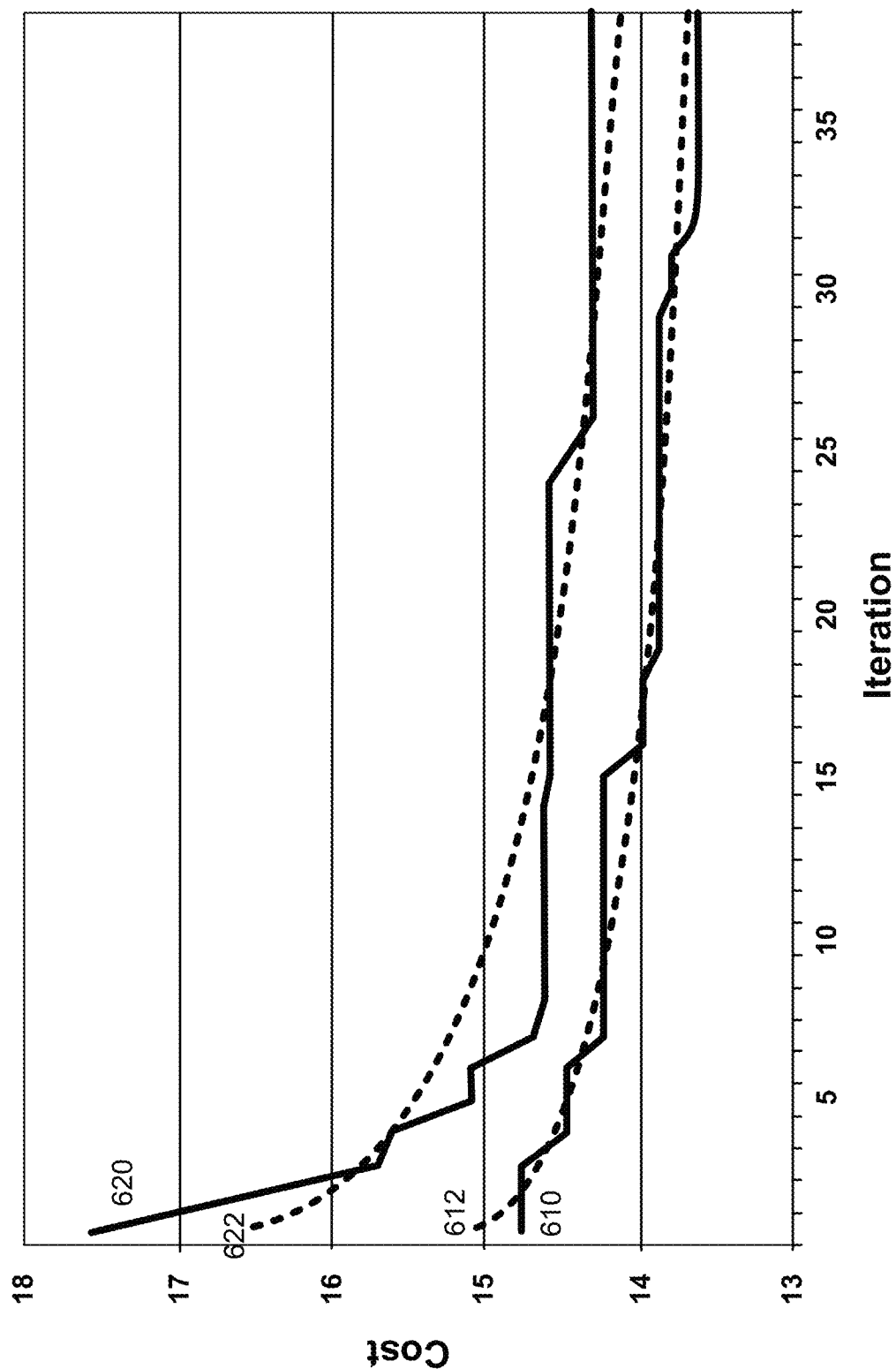
FIG. 6 illustrates source mask optimization results comparing source seeds inferred by neural network versus a typical seed selection method.

FIG. 6 illustrates source mask optimization results comparing source seeds inferred by neural network versus a typical seed selection method. The solid curves 610, 620 plot an optimization cost function as a function of the iteration. The optimization cost function is a measure of the quality of the current source shape. In this case, lower cost is better. Curve 610 shows progression using the present U-net based approach described above, and curve 620 shows progression using the typical seed selection approach with arbitrary initial source shapes. The dashed lines 612, 622 are curve fits to the solid curves 610, 620. Curve 612 is for the present U-net based approach and curve 622 is for the typical SMO approach.

This approach has been demonstrated to improve runtime and SMO results. The machine learning model provides better results in terms of runtime and quality of result as demonstrated by the lower cost value on the convergence curves shown in FIG. 6. For the deep ultraviolet SMO case shown in FIG. 6, the U-net based source shaping results 610, 612 show an improved quality of result and turn-around time when compared to another typical SMO flow result 620, 622 which uses source shapes that do not consider the mask patterns being optimized for the initial shapes. In this example, the typical SMO method does not obtain the higher quality of result that the present SMO method provides.

Figure 7:
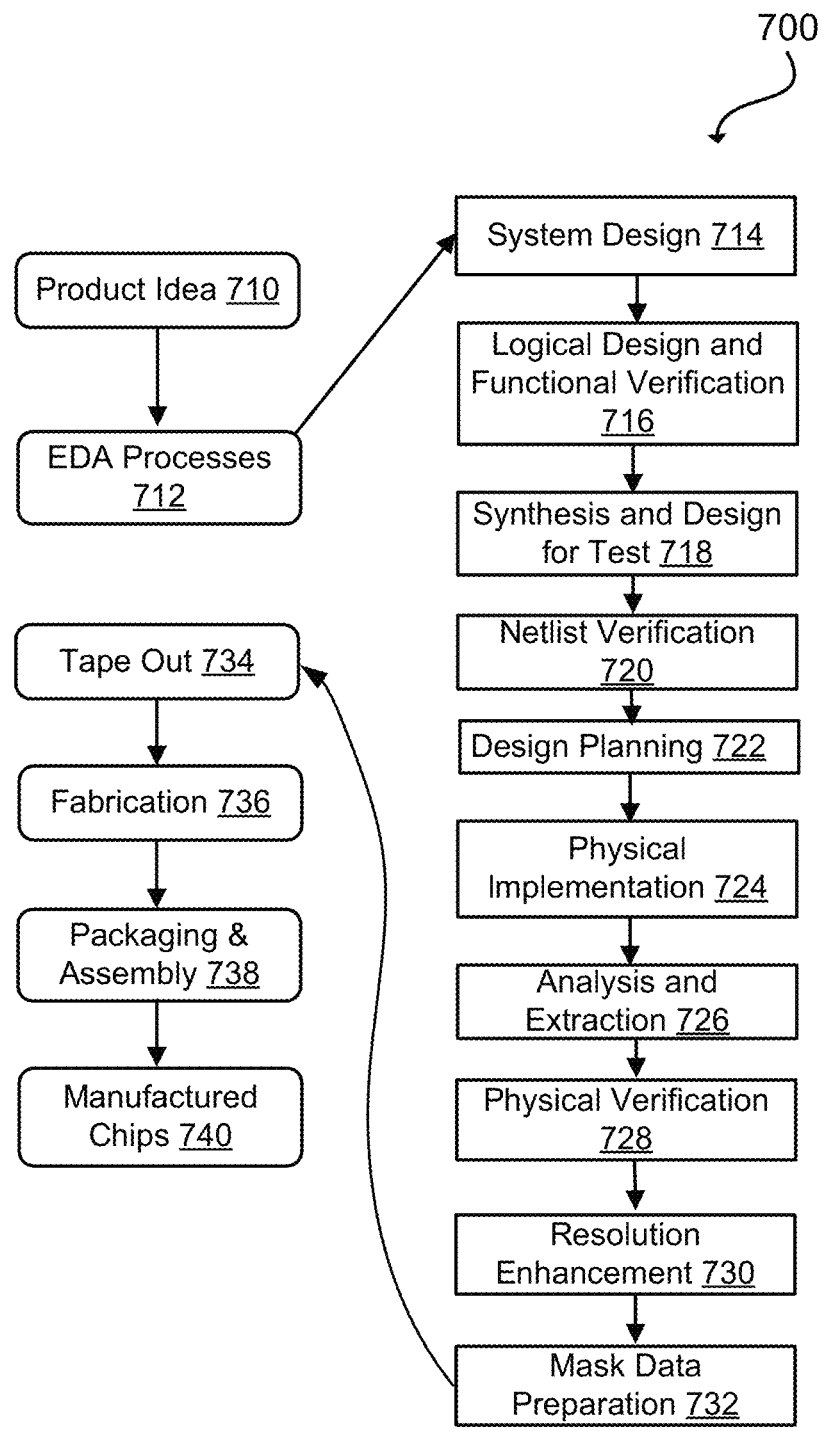
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
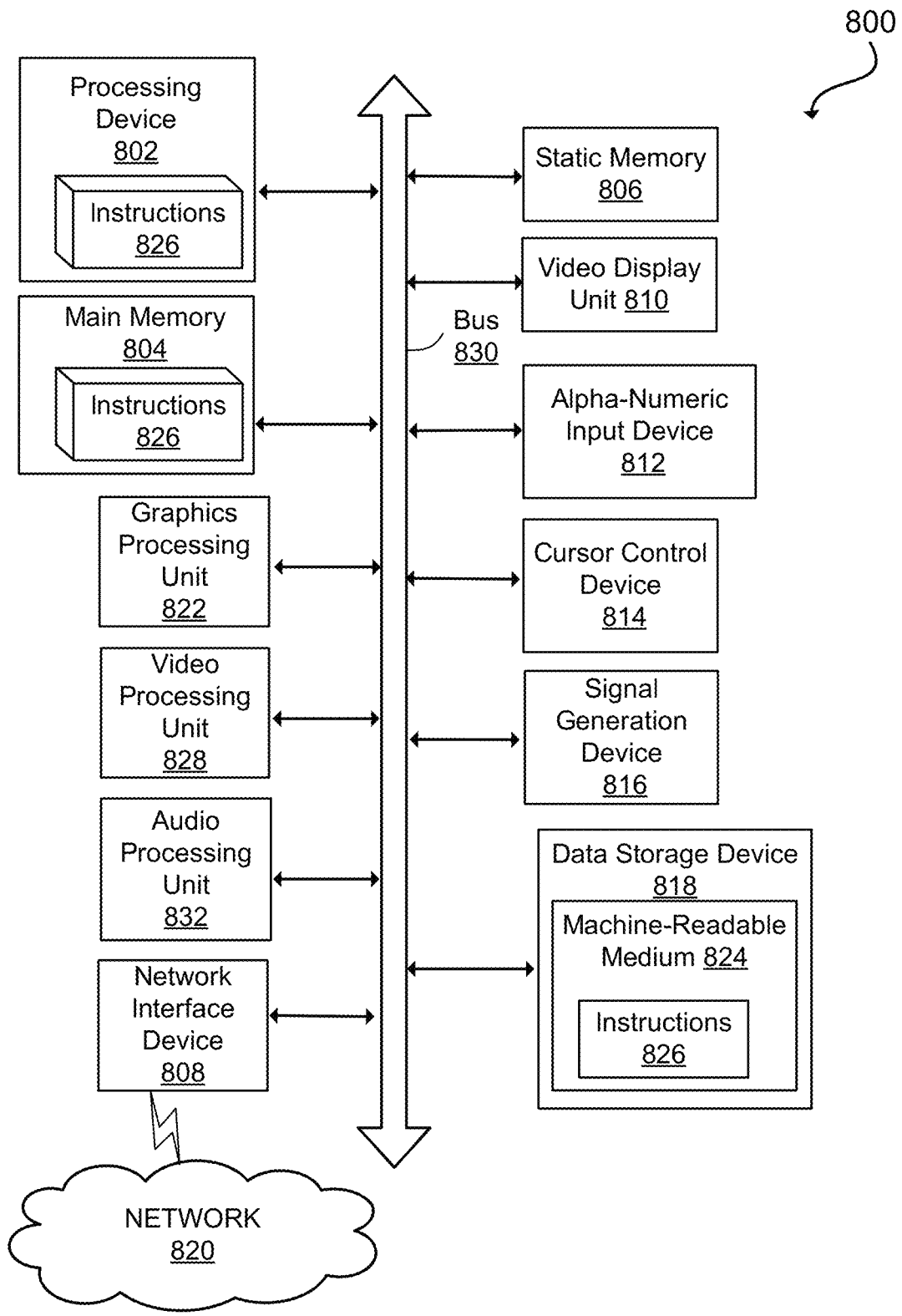
FIG. 8 depicts a diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a layout of a lithographic mask;
   applying, by a processor, a machine learning model to infer source shapes from the layout of the lithographic mask; and
   providing the inferred source shapes as initial source shapes that are used as a starting point for a source mask optimization process.

2. The method of claim 1, wherein the machine learning model infers source seeds from the layout of the lithographic mask; and using the inferred source shapes as initial source shapes comprises generating the initial source shapes from the inferred source seeds.

3. The method of claim 1, further comprising:
   selecting clips from the layout of the lithographic mask based on a sensitivity metric to process variations in the clips, wherein the machine learning model infers source shapes from the selected clips.

4. The method of claim 3, wherein the sensitivity metric is a sensitivity metric of aerial images produced by the clips to process variations in the clips.

5. The method of claim 1, further comprising:
   selecting clips from the layout of the lithographic mask based on which clips are close to design rule limits for the layout of the lithographic mask, wherein the machine learning model infers source shapes from the selected clips.

6. The method of claim 1, wherein the layout of the lithographic mask includes features for testing compliance with design rules, and the method further comprises:
  selecting clips from the layout of the lithographic mask that include the features, wherein the machine learning model infers source shapes from the selected clips.

7. The method of claim 1, wherein an output of the machine learning model comprises images of Fourier Bessel coefficients for the inferred source shapes.

8. The method of claim 1, wherein the machine learning model comprises a U-net.

9. The method of claim 1, wherein the method is performed iteratively for different design iterations of the layout of the lithographic mask.

10. A non-transitory computer readable medium comprising stored instructions, which when executed by a processor, cause the processor to:
  receive a layout of a lithographic mask;
  select clips from the layout of the lithographic mask;
  select source shapes based on the selected clips; and
  provide the selected source shapes as initial source shapes that are used as a starting point for a source mask optimization process.

11. The non-transitory computer readable medium of claim 10, wherein selecting the clips is based on sensitivity to process variations in the clips.

12. The non-transitory computer readable medium of claim 11, wherein selecting clips is based on sensitivity of aerial images produced by the clips to process variations in the clips.

13. The non-transitory computer readable medium of claim 11, wherein selecting clips is based on sensitivity of resist profiles produced by the clips to process variations in the clips.

14. The non-transitory computer readable medium of claim 10, wherein selecting clips is based on which clips are close to design rule limits for the layout of the lithographic mask.

15. The non-transitory computer readable medium of claim 10, wherein the layout of the lithographic mask includes features for testing compliance with design rules, and the selected clips said features.

16. A system comprising:
  a memory storing instructions; and
  a processor, coupled with the memory and to execute the instructions, the instructions when executed cause the processor to:
    access a training set comprising (a) inputs comprising clips taken from layouts of lithographic masks; and (b) outputs comprising corresponding source shapes; and
    train a machine learning model using the training set, wherein the machine learning model infers initial source shapes from layouts of lithographic masks, the initial source shapes used as starting points for a source mask optimization process.

17. The system of claim 16, wherein the input clips in the training set comprise instances of parameterized clips for different parameter values.

18. The system of claim 16, wherein the input clips in the training set comprise clips based on design rules for the layout of the lithographic mask.

19. The system of claim 16, wherein the input clips in the training set comprise clips representing contacts, lines and spaces of different geometries.

20. The system of claim 16, wherein the input clips in the training set comprise input clips and corresponding source shapes from previously designed lithographic masks and source shapes.

* * * * *